Feb. 6, 1962 F. A. CUNNINGHAM ET AL 3,019,746
EXTRUDING APPARATUS
Filed Sept. 10, 1957 4 Sheets-Sheet 1

INVENTORS
Fred A. Cunningham
John O. Klatt
Reams F. Brown
Woodrow W. Slovacek
BY Bacon & Thomas ATTORNEYS

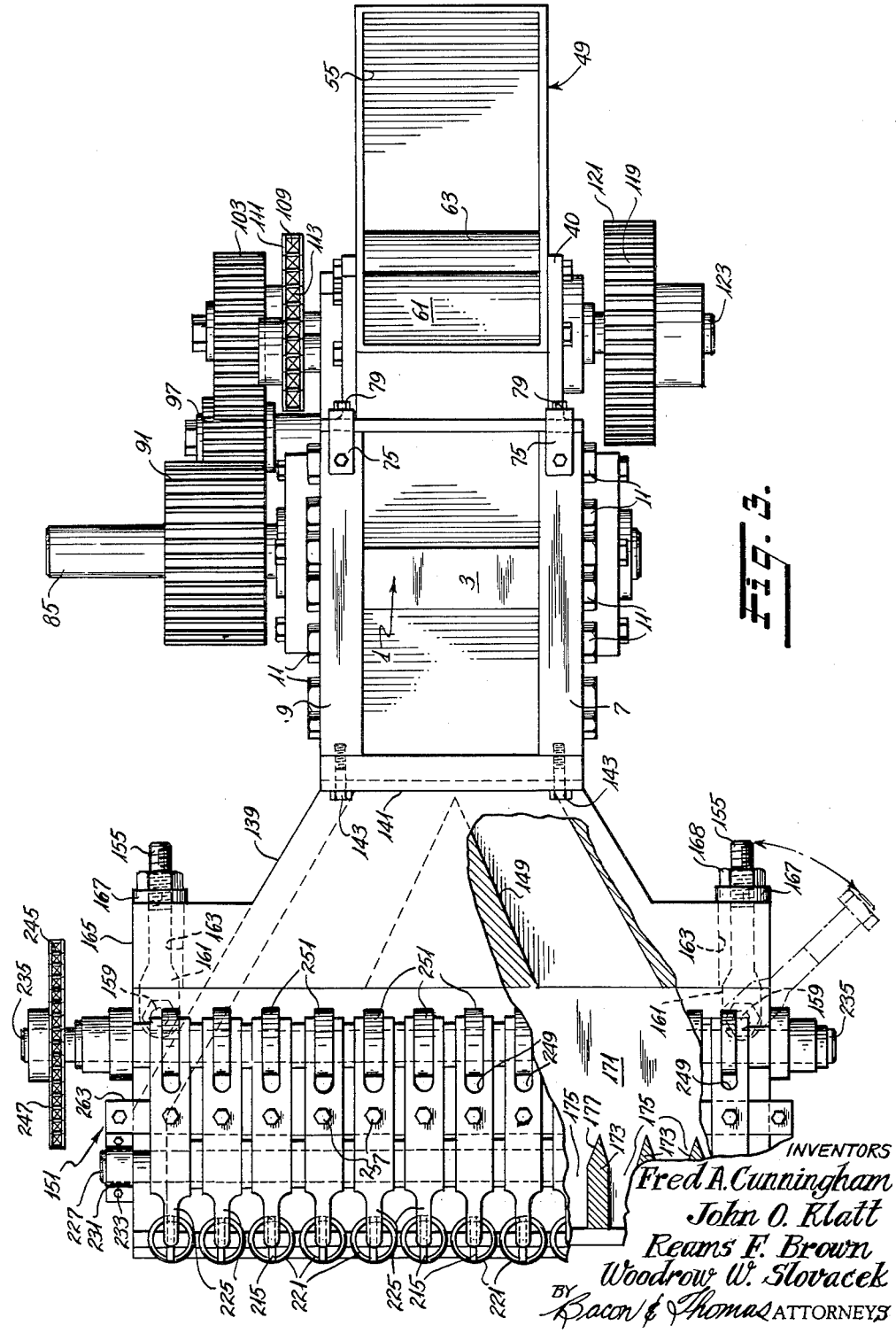

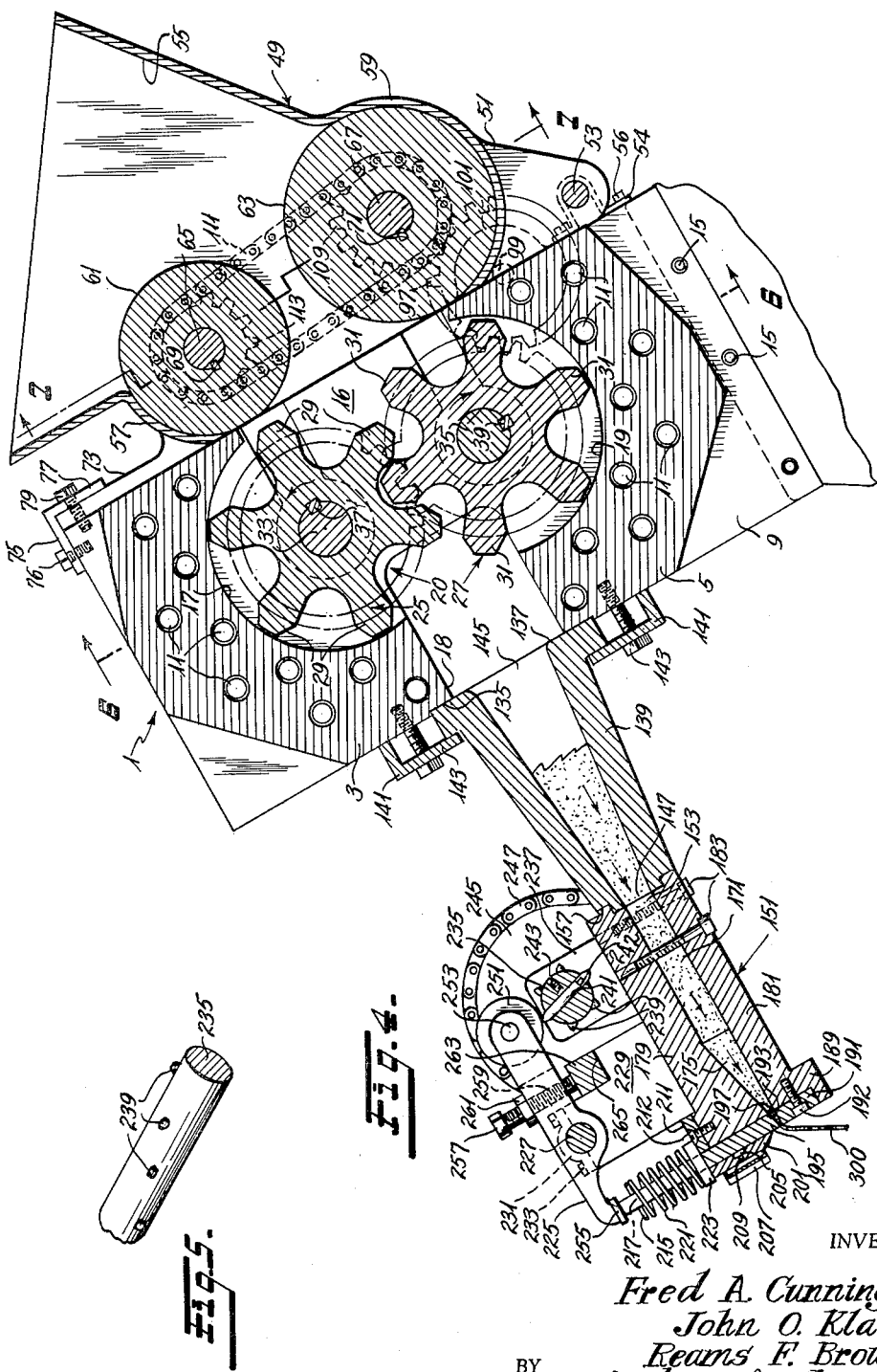

Feb. 6, 1962   F. A. CUNNINGHAM ET AL   3,019,746
EXTRUDING APPARATUS
Filed Sept. 10, 1957   4 Sheets-Sheet 4
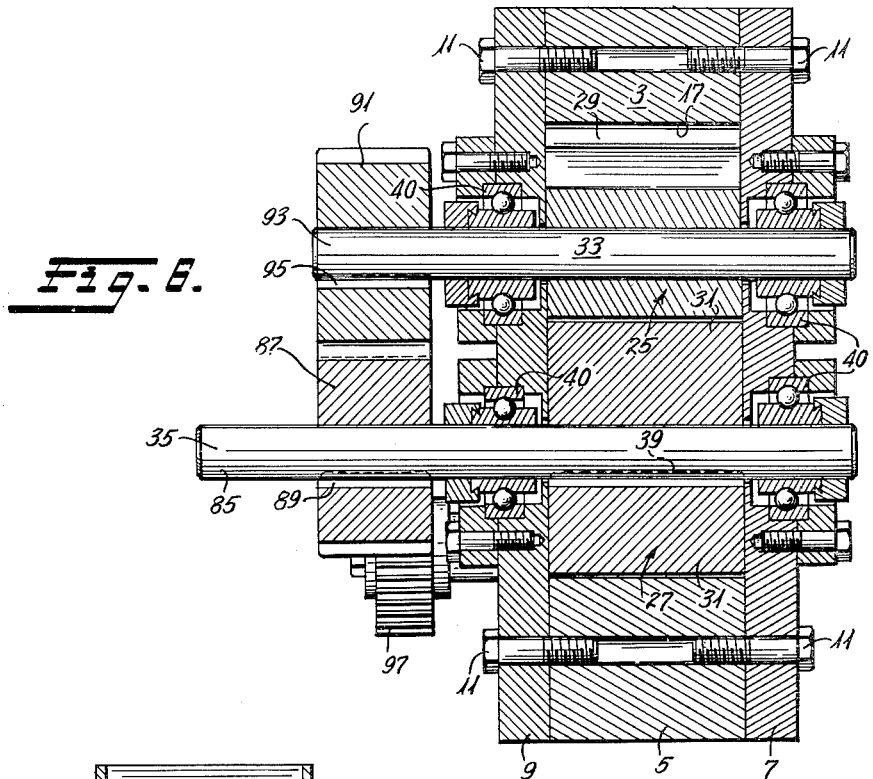
INVENTORS
Fred A. Cunningham
John O. Klatt
Reams F. Brown
Woodrow W. Slovacek
BY Bacon & Thomas ATTORNEYS United States Patent Office 3,019,746
Patented Feb. 6, 1962

3,019,746
EXTRUDING APPARATUS
Fred A. Cunningham, John O. Klatt, Reams F. Brown, and Woodrow W. Slovacek, all of San Antonio, Tex., assignors to The Facs Manufacturing Company, Inc., San Antonio, Tex., a corporation of Texas
Filed Sept. 10, 1957, Ser. No. 683,045
8 Claims. (Cl. 107—14)

This invention relates generally to extruders, and more particularly to a device for extruding material into segmented thin ribbonlike strips.

It is a primary object of the present invention to provide extruding apparatus wherein the material is forced through thin die orifices under extremely high pressure, and wherein means are provided to prevent over-sized particles of the material from clogging the orifices.

Another object of the invention is to provide extruding apparatus which is sturdy in construction, capable of handling the material under the aforementioned pressure, and yet is compact and readily movable when desired.

Another object is to provide extruder apparatus for handling a continuous supply of material to be extruded.

A further object is to provide extruder apparatus which may be readily disassembled when desired for the purpose of cleaning or repairing.

Another important object is to provide an extruding apparatus for a plurality of thin die orifices, wherein one or more of the orifices may be closed off when desired without substantially affecting the operation of the rest of the apparatus.

Another object is to provide extruder apparatus which is economical to manufacture and efficient in operation.

Other objects and advantages will be apparent from the following description taken in conjunction with the accompanying drawings, in which:

FIG. 3 is a top plan view of the extruder shown in FIG. 2, portions thereof being broken away to disclose certain details of the apparatus;

FIG. 4 is a cross-sectional view taken along the line 4—4 of FIG. 2;

FIG. 5 is a fragmentary perspective view of one of the elements shown in FIG. 4;

FIG. 6 is a sectional view taken along the line 6—6 of FIG. 4; and

FIG. 7 is a sectional view taken along the line 7—7 of FIG. 4.

Figure 1:
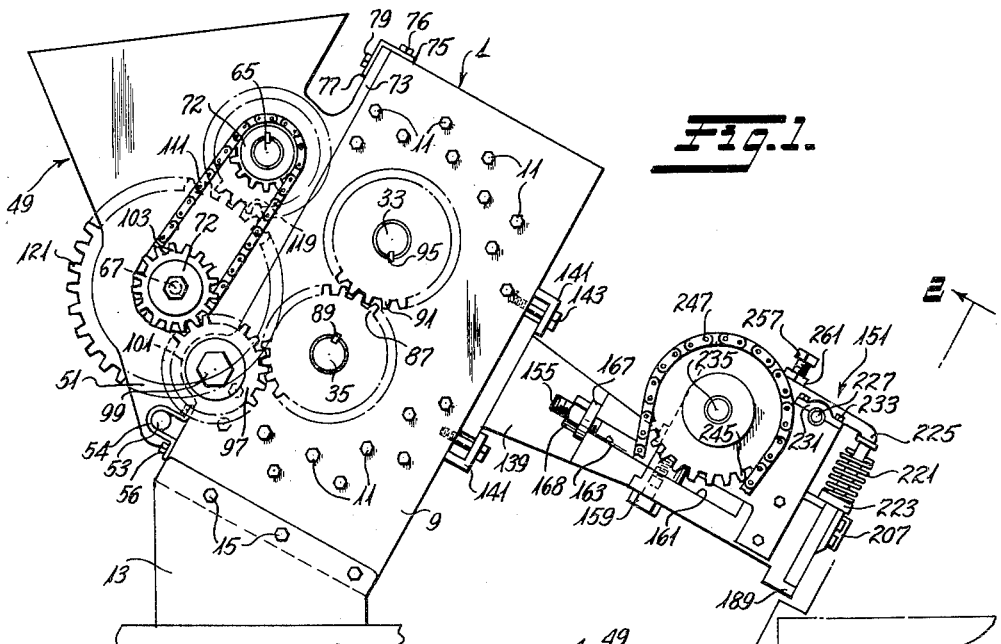
FIG. 1 is a side elevational view of an extruder embodying the principles of the present invention.
Figure 2:
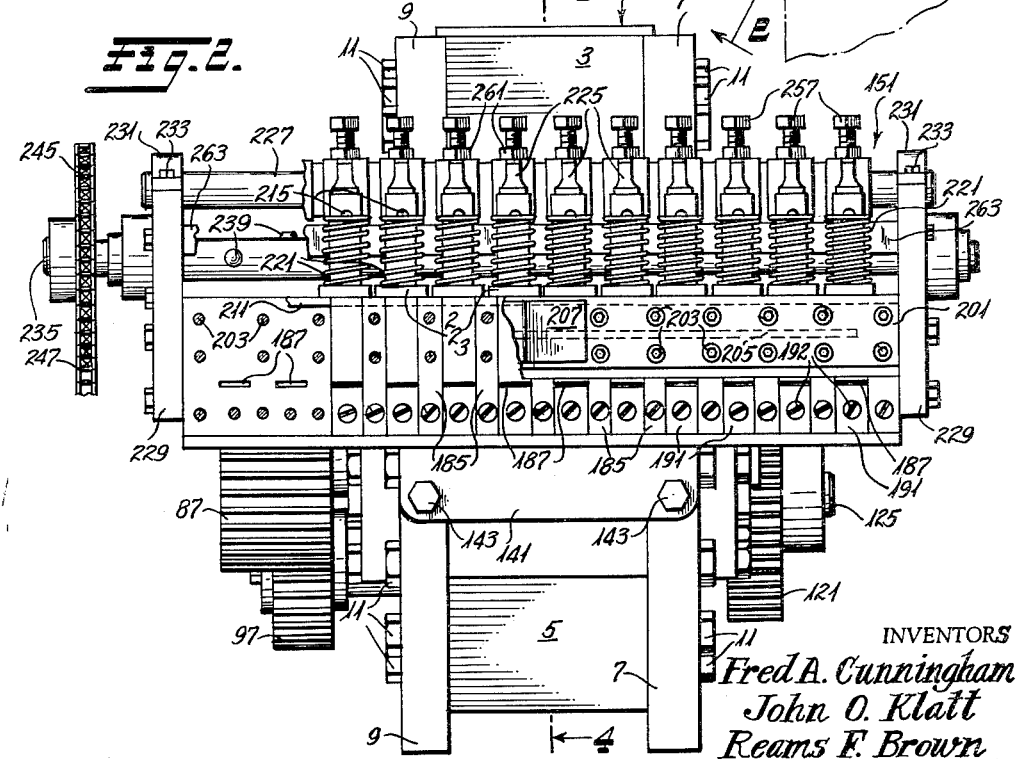
FIG. 2 is an elevational view on an enlarged scale, taken along line 2—2 of FIG. 1.

Referring now more specifically to the drawings, the extruder comprises a gear pump, generally indicated by the numeral 1, which includes upper and lower wall members 3 and 5 and side walls 7 and 9 rigidly connected thereto by a plurality of bolts 11. The pump 1 is mounted on a stand 13 by means of bolts 15 securing the side walls 7 and 9 thereof to said stand. Walls 3 and 5 are spaced from each other to effect an inlet opening 16 and an outlet opening 18 therebetween. A central chamber 20 is defined by opposed concave arcuate inner surfaces 17 and 19 in walls 3 and 5 respectively and communicates with inlet 16 and outlet 18. Gears 25 and 27 are mounted on horizontal axes between side walls 7 and 9, gears 25 and 27 having teeth 29 and 31 closely intermeshing and closely fitting against the respective inner surfaces 17 and 19 and against side walls 7 and 9. Gears 25 and 27 are fixed on shafts 33 and 35, as by keys 37 and 39, the shafts being journalled in bearings 40 in sidewalls 7 and 9.

A hopper 49 includes ears 51 at its lower extremities which are hinged on pin 53 to the gear pump 1 by means of brackets 54 suitably secured to side walls 7 and 9 by bolts 56. The hopper 49 includes a wide mouth 55 for the reception of material to be extruded, and is formed at its inner end with opposed upper and lower rounded wall portions 57 and 59 for the reception of a pair of spaced upper and lower delivery rolls 61 and 63 fixedly mounted on shafts 65 and 67 by keys 69 and 71.

Shafts 65 and 67, in turn, are journalled in bearings 72 at opposite sides of the hopper 49. It will be noted from the disclosure of FIG. 4 that the upper roll 61 is smaller than the lower roll 63 and is positioned somewhat inwardly therefrom. Thus, when the shafts 65 and 67 are driven at appropriate rates of speed, the peripheral speed of the rolls 61 and 63 will be equal. The material to be extruded will, accordingly, drop by gravity onto roll 63 where it is carried by the peripheral movement thereof into the space between rolls 61 and 63, from whence it is delivered in an oblique direction towards the gear pump 1.

The inner extremities of rounded wall portions 57 and 59 are machined to fit tightly against the respective adjacent surfaces of upper wall 3 and lower wall 5 of gear pump 1. Dogs 73 extend upwardly from the opposite sides of rounded portions 57 along the adjacent edge of upper wall 3 to the top of the gear pump housing. Brackets 75 are secured to the top of side walls 7 and 9 by bolts 76 and include downwardly extending flanges 77 fitting tightly over the dogs 73 and secured in position by bolts 79. It will readily be seen that when the brackets 75 are loosened, they may be pivoted out of position to permit the entire delivery portion 49 to be pivoted away from the gear pump 1 about the hinge connection 53 to provide ample access to the inside of the gear pump.

To actuate the delivery rolls 61 and 63 of hopper 49 and the gears 25, 27 of the gear pump, power from any suitable source (not shown) is connected to an extending portion 85 of the shaft 35 to rotate gear 27 in a clockwise direction as viewed in FIG. 4. A gear 87 is keyed to the extending portion 85 of the shaft 35 as by key 89. A gear 91, meshing with the gear 87 is keyed to an extending portion 93 of the shaft 33 by means of a key 95, thereby rotating the gear 25 in a counterclockwise direction as viewed in FIG. 4. An idler gear 97 is rotatably mounted on stub shaft 99, which may be secured to an ear 101 on the pump housing. Gear 97 meshes with the gear 87 and with a gear 103 rotatably mounted on an extending portion 105 of the shaft 67, a bearing sleeve 107 being interposed therebetween. Gear 103 includes a hub 108 carrying a sprocket 109. Sprocket 109, in turn, is connected by a chain 111 to a sprocket 113 which is keyed to an extended portion 115 of the shaft 65 by key 117. Meshing gears 119 and 121 are keyed, respectively, to an extending portion 123 at the opposite end of shaft 65, and to an extending portion 125 at the opposite end of shaft 67 by keys 127 and 129. Accordingly, clockwise rotation of the shaft 35 effects: counterclockwise rotation of the gear 97; clockwise rotation of the gear 103; clockwise rotation of the sprocket 109, chain 111, shaft 65 and delivery roll 61; and counterclockwise rotation of the shaft 67 and delivery roll 63 (all as would be viewed from the direction of FIG. 4). Gear 121, as will be clearly seen in FIG. 7 of the drawings, is larger than gear 119, and therefore the shaft 65 is driven at a greater rate of speed than the shaft 67 to effect equal peripheral speeds of the delivery rolls 61 and 63.

At the outlet opening 18 of the gear pump housing, a recessed portion 135 is formed to snugly receive the outwardly flanged inlet end 137 of a throat or distributing section 139. Laterally extending brackets 141, overlapping the flanged portion 137 and bolted to the housing of gear pump 1 by bolts 143, serve to keep the throat section in tightly assembled relation with respect to the gear pump. Disassembly can be readily effected for cleaning purposes or the like by removal of the bolts 143. The throat section 139 is vertically tapered from its inlet 145 to its outlet 147 and is horizontally outwardly flared in this direction. A V-shaped barrier 149 is interposed in the passageway between inlet 145 and outlet 147 to divide the material being conveyed therethrough in two outwardly diverging paths.

An extruder head 151 having an inlet 153 communicating with the outlet 147 of throat section 139 is connected to the throat section by means of a pair of pivoted bolts 155. The outlet end of throat section 139 is rabbeted as indicated at 157, the adjoining inlet end of extruder head 151 being machined to snugly interfit therewith. One end of each bolt 155 is pivoted about the shank of a vertically extending bolt 159 at the corner of the extruder head and extends through a horizontal cut-away portion 161 of the extruder head and through a horizontal slot 163 in an outer portion 165 of the throat section 139, and is secured with a washer 167 and nut 168 against the back surface of section 165. As will readily be seen from the view of FIG. 3, when nuts 168 are loosened, the bolts 155 may be pivoted outwardly beyond the corners of section 165 to permit separation of the extruder head 151 from throat section 139.

Inlet 153 communicates with a passage 171 which is divided at its outer end by separating walls 173 into a plurality of tapered passageways 175. The innermost extremities of the walls 173 are themselves tapered, as at 177, to divide the material being conveyed through extruder head 151 into the various passageways 175. The upper wall 179 and lower wall 181 of extruder head 151 may be rigidly supported in appropriate spaced relation by bolts 183 extending therebetween to prevent expansion of the passageway 171 under the high pressure emanating from the gear pump.

A plurality of spacer strips 185 are bolted across the front face of the extruder head 151 between the outlets 187 of passages 175. The bottom extremities of spacer strips 185 nest against an outwardly extending flange 189 of bottom wall 181 and extend for the full height of the front face of extruder head 151. Between spacer strips 185 are secured, by screws 192, insert members 191 which have their upper surfaces 193 positioned to form a flat continuation of the lower surface of passages 175. Above each insert member 191, between spacer strips 185, a cutting and mashing element 195 is slidably mounted. The elements 195 have underfaces 197, which are bevelled at such an angle that they will lie in the same plane as the tapering upper surfaces of passages 175 when positioned in a manner to be described. The aforesaid undersurfaces are preferably about one-quarter inch or more in thickness to provide an effective mashing surface. A bar 201 extends across the front face of extruder head 151, being connected with spacing strips 185 and the upper wall 179 by bolts 203, and thus serves to prevent forward displacement of elements 195. A horizontally extending channel 205 formed on the inner surface of bar 201 serves to distribute lubricants to the sliding elements 195 from a suitable source (not shown) through lubricant feed box 207 and port 209.

A hardened bearing strip 211 is fastened across the top of extruder head 151 at the front end of wall 179 by screws 212. Elements 195 extend upwardly beyond strip 211 and bar 201, and each has a pin 215 extending therethrough, through a slot 217. The outer ends of pins 215 are each formed to receive and center the upper extremity of a high-rate compression spring 221. The compression springs 221 surround the upper portions of elements 195 and their lower ends bear against washers 223 mounted on top of bar 201 and strip 211.

Each element 195 is adapted to be actuated through the agency of an individual arm 225 pivotally mounted on a shaft 227 which is, in turn, mounted between supports 229 extending upwardly from the top of extruder head 151 at either end thereof. The shaft 227 is clamped in position by fitted clamping members 231 secured by bolts 233 to the top of supports 229. A shaft 235 is journalled in supports 237 which extend upwardly from the top of extruder head 151 at either end thereof, rearwardly of supports 229. A plurality of cam elements 239 are arranged in helically staggered relation along the peripheral surface of shaft 235, as shown in FIG. 5, the cam elements 239 being received in sockets 241 in shaft 235. A set screw 242 of smaller diameter is inserted from the opposite side of the shaft into the bottom of each socket 241 to bear against the inner end of the respective cam element 239. Thus, the cam elements 239 can be adjusted to a desired position and readjusted when necessary, for example, to compensate for wear. Set screws 243, extending towards the center of shaft 235 at right angles to each socket 241, serve to lock the cam elements 239 in adjusted position. Shaft 235 extends outwardly of one end of the extruder head 151 and is provided with a sprocket 245 adapted to be driven at variable speeds through chain drive 247 by any suitable power source (not shown).

A horizontal slot 249 is formed at the rear end of each arm 225 for the reception of a wheel 251 rotatably mounted therein on a pin 253. The front end of each arm 225 is provided with a downwardly faced head 255 adapted to engage the top of the respective element 195. As shaft 235 is rotated, the cam elements 239 successively engage the adjacent wheels 251 causing arms 225 to rock on shaft 227. Thus, the elements 195 are forced downwardly against the pressure of springs 221, closing the outlets of passages 175 in staggered sequence. Due to the strength of springs 221 and the rapid rotation of shaft 235, the opening and closing of the outlets is a sudden, instantaneous action.

Bolts 257 extend through vertical threaded apertures 259 in the arm 225 rearwardly of the shaft 227, and are furnished with locknuts 261. The lower ends of bolts 257 are adapted to extend beyond the bottom of arms 225 and abut against a transverse member 263 mounted on suitably formed shoulders 265 of supports 229. It will readily be seen that the bolts 257 abutting against transverse member 263 determine the upper limit of the sliding movement of elements 195, and that suitable adjustment of bolts 257 will vary the size of the die orifices, or close them completely when desired.

In operation, a material to be extruded, such as corn masa, is delivered from the hopper 55 through delivery rolls 61 and 63 to the gear pump 1. The gear 25 and 27, being driven in the manner described hereinabove and fitting tightly against surfaces 17 and 19 effect high-pressure delivery of the material into the throat or distributing section 139. Under this pressure, the material is flattened and fanned out by the configuration of the passage through section 139 and delivered into passage 171 of the extruder head 151. As material is forced into each passage 175, it is flattened even further, and with correct adjustment each element 195 forms a continuation of the top of passage 175, the material emerging therethrough as at 300 in a thin flat ribbonlike form approximately .0025 inch in thickness. Due to the wide distribution of passages 175 in the extruder head, the V-shaped barrier 149 in the throat section 139 is critical for the proper functioning of the apparatus with various types of materials. Such materials are thus delivered to the passages 175 at opposite sides of the extruder head and will converge after passing barrier 149 to be delivered to all of the passages 175 therebetween. In the absence of this barrier, it has been found that certain materials will be delivered only to those passages 175 which lie at the center of the extruder head.

Intermittent depression of each element 195 serves to cut the thin ribbon of material and also by virtue of the width of the under surfaces 197 to mash any portion of the material which is too large to fit through the thin orifice. The elements 195 are therefore self-cleaning, since material which would normally clog the orifices is subjected to one or more mashing actions by the intermittent depression of elements 195 and is thereby compressed into such form that it will pass through the thin outlet orifices.

If it is desired to close one or more of the orifices, the respective bolt or bolts 257 can simply be moved to their lowermost position. Thus, when the orifice does become clogged or when the supply of material is slowed, the orifice or orifices concerned may be closed without affecting the continued operation of the remaining orifices.

It will thus be seen that the apparatus hereinabove described fully achieves the stated objects and it will be understood that modifications in form and proportion may be made without departing from the spirit of the invention or the scope of the annexed claims.

We claim:

1. Extruding apparatus, comprising: means defining a shallow passageway; an element moveably mounted above said passageway at the downstream end thereof, said element having a bevelled undersurface constituting a tapering upper wall of said passageway at said downstream end; means for forcing material into said passageway under pressure; and means for intermittently depressing said element to cut off the material which has passed thereunder and to simultaneously mash any material thereunder with said undersurface.

2. Extruding apparatus, comprising: means defining a shallow passageway having its upper wall converging downwardly with respect to its lower wall in the direction of flow; an element slidably mounted above said passageway at the downstream end thereof, said element having a bevelled undersurface constituting the upper wall of said passageway at said downstream end; stop means for preventing upward sliding movement of said element beyond a normal open position with the inner edge of said bevelled surface lying in the plane of the rest of said upper wall, said element being bevelled at such an angle that the entire upper wall defines a single, substantially continuous plane; means for forcing material into said passageway under pressure; spring means acting to move said element upwardly into normal open position; and means for intermittently depressing said element against the action of said spring to cut off the material which has passed thereunder and to simultaneously mash any material thereunder with said undersurface.

3. Extruding apparatus, comprising: means defining a plurality of shallow passageways arranged in side-by-side relation; an element moveably mounted above each of said passageways at the downstream ends thereof, each of said elements having a bevelled undersurface constituting a downwardly converging upper wall of its respective passageway at said downstream end; means for forcing material into said passageways under pressure; and means for intermittently depressing said elements in staggered sequence to cut off the material which has passed thereunder and to simultaneously mash any material thereunder with said undersurface.

4. Extruding apparatus, comprising: a pump; a distributing member having its inlet communicating with the outlet of said pump; said distributing member having a passageway flared outwardly and tapered vertically; an extruder head having a plurality of passages therein arranged in side-by-side relation and adapted to receive material from the passageway of said distributing member; means defining die orifices in said extruder head at the end of said passageway; and means removably connecting said distributing member with said pump and with said extruder head.

5. In combination, an extruder head having a passage therethrough, a slidable element mounted on the face of said extruder head at the outlet of said passage, said element being adapted to close said passage when in its lowermost position, spring means forcing said element upwardly, stop means limiting the upward movement of said element, a shaft located rearwardly of said element and rotatably mounted in spaced relation above the top of said extruder head, means for driving said shaft, a cam element projecting outwardly from the peripheral surface of said shaft, and linkage for depressing said slidable element against the force of said spring when actuated by said cam element.

6. The device of claim 5 wherein said stop means are adjustable.

7. Extrusion apparatus, comprising: an extruder head having a plurality of passages therethrough in side-by-side relation; vertically slidable elements mounted on the face of said extruder head at the outlet of each of said passages, each of said elements being adapted to close its associated passage when in its lowermost position; spring means forcing said elements upwardly; stop means for limiting the upward movement of said elements; a shaft rotatably mounted rearwardly of said element in spaced relation above the top of said extruder head; means for driving said shaft; and a rocker arm mounted between each of said elements and said shaft, whereby helically disposed cam elements on said shaft rock said rocker arms to depress said sliding elements against the force of said springs in sequentially staggered order.

8. Extruding apparatus comprising: a gear pump having an inlet and an outlet and including a pair of meshing gears fixedly mounted on shafts; a distributing member having an inlet and an outlet and being removably attached to said gear pump with its inlet communicating with the outlet of said gear pump; an extruder head having an outlet comprising die orifices and having an inlet communicating with the outlet of said distributing member, said extruder head being removably connected to said distributing member; a delivery member hingedly connected to said gear pump and having an outlet communicating with the inlet of said gear pump, said delivery member being pivotable about said connection away from said inlet of said gear pump; a pair of delivery rolls mounted on shafts in said delivery member adjacent the outlet thereof; drive means for driving said delivery rolls and said gears of said gear pump, said drive means including an intermediate gear rotatably mounted on said hopper and meshing with an intermediate gear rotatably mounted on said gear pump, said gears being separated and taken out of mesh when said delivery member is pivoted away from the inlet of said gear pump.

References Cited in the file of this patent

UNITED STATES PATENTS

| | | |
|---|---|---|
| 174,244 | Holmes | Feb. 29, 1876 |
| 1,422,768 | Kent et al. | July 11, 1922 |
| 1,730,932 | Glisce | Oct. 8, 1929 |
| 1,973,225 | Paterson et al. | Sept. 11, 1934 |
| 2,533,796 | Harris et al. | Dec. 12, 1950 |
| 2,740,362 | Elliott | Apr. 3, 1956 |

FOREIGN PATENTS

| | | |
|---|---|---|
| 27,601 | Sweden | Nov. 30, 1907 |
| 490,353 | Germany | Jan. 27, 1930 |